United States Patent [19]

Miller et al.

[11] Patent Number: 6,067,587
[45] Date of Patent: May 23, 2000

[54] METHOD FOR SERIALIZING AND SYNCHRONIZING DATA PACKETS BY UTILIZING A PHYSICAL LOCK SYSTEM AND A CONTROL DATA STRUCTURE FOR MUTUAL EXCLUSION LOCK

[75] Inventors: Jeffrey B. Miller, Menlo Park; Tuan Nguyen, Milpitas, both of Calif.

[73] Assignee: Sutmyn Storage Corporation, Santa Clara, Calif.

[21] Appl. No.: 09/098,444

[22] Filed: Jun. 17, 1998

Related U.S. Application Data

[60] Provisional application No. 60/049,928, Jun. 18, 1997.

[51] Int. Cl.$^7$ ...................................................... G06F 13/14
[52] U.S. Cl. .................................. 710/20; 710/17; 710/18; 710/19; 710/21; 710/74; 710/200; 707/8
[58] Field of Search ................................. 710/200, 17–21, 710/74; 707/8; 711/145, 147, 156, 163

[56] References Cited

U.S. PATENT DOCUMENTS

| | | | |
|---|---|---|---|
| 4,435,766 | 3/1984 | Haber et al. | 710/200 |
| 4,467,421 | 8/1984 | White | 711/118 |
| 5,297,269 | 3/1994 | Donaldson et al. | 711/145 |
| 5,333,319 | 7/1994 | Silen | 709/103 |
| 5,559,979 | 9/1996 | Shiga et al. | 711/218 |
| 5,669,002 | 9/1997 | Buch | 710/200 |
| 5,737,600 | 4/1998 | Geiner et al. | 707/200 |
| 5,859,965 | 1/1999 | Gittins et al. | 395/185.05 |
| 5,894,583 | 4/1999 | Johnson et al. | 710/48 |

Primary Examiner—Thomas C. Lee
Assistant Examiner—Ilwoo Park
Attorney, Agent, or Firm—Towsend and Townsend and Crew LLP

[57] ABSTRACT

A system for serializing and synchronizing data stored in a tape drive emulation system utilizes a physical lock system and control data MUTEXes to assure serialization.

3 Claims, 7 Drawing Sheets

6,067,587

METHOD FOR SERIALIZING AND SYNCHRONIZING DATA PACKETS BY UTILIZING A PHYSICAL LOCK SYSTEM AND A CONTROL DATA STRUCTURE FOR MUTUAL EXCLUSION LOCK

CROSS-REFERENCE TO RELATED APPLICATIONS

The present invention claims the benefit of Provisional Patent Application No. 60/049,928, filed Jun. 18, 1997 entitled "DATA SERIALIZATION", which is incorporated herein by reference for all purposes.

BACKGROUND OF THE INVENTION

The present invention relates generally to data storage systems and more particularly relates to tape drive emulation (TDE) systems.

Many data processing systems utilize tape drives for storage of data. Channel interfaces and commands generated by a data source to control the transfer of data from a host computer to a tape drive are well-known in the art and will not be described in detail here. One example of an operating system for managing data transfer between a host computer and a tape drive is the MVS system manufactured by the IBM Corporation.

Write and read operations of a tape drive are, of course, all sequential from the viewpoint of the using host or hosts. Thus, even though I/O may be done over multiple ESCON links (or over such other channel path types as BMC or SCSI), all leading to the same drive, commands for the drive are issued and active on only one link or path at a time. Ending status for each command must reach the channel which issued the command before it or another channel will issue a subsequent command.

Within a tape subsystem, a drive commonly connects to two tape controllers and each controller connects to more than one host channel or ESCON link. Within each tape controller, a data buffer set and a data formatter, including compression circuits, are shared by processes routing data to and from multiple drives and routing data to and from multiple host connections. Further, the two controllers connecting to a drive often have connections also to each other's data buffer and formatter.

Channel connections (ESCON or other) may link a controller to more than one host to permit sharing of tape drives, though not to allow multiple computers to do I/O to a given tape during a single period when the tape is mounted on a drive. A reliable scheme of reservations is needed to serialize the use of such shared drives among the hosts.

In the course of writing a single tape, more than one of the many paths available through the subsystem might be used. Multiple data blocks on their way to a tape may arrive on different paths and be buffered in controllers at one time. Even though the blocks leave the host in a wanted sequence, ensuring that they reach the tape in the same sequence requires a reliable system of data serialization rules and mechanisms.

Drive Serialization

In many tape subsystems, drive serialization is accomplished by a convention under which hosts first declare "path groups" to identify sets of host-to-controller-to-drive paths which are eligible to be used concurrently by a single host for I/O to a single drive. Data to/from a drive may move across paths in such a group in any pattern of alternating choice of path. "Alternation" means the paths may be used "concurrently" but not "simultaneously," since I/O is always sequential—one command at a time.

For a host to actually use a drive, the drive must be "assigned" to the path group created for that host's use of the drive. Assignment has the quality of a mutual exclusion lock or "mutex" in that a drive can only be assigned to paths of one group at a time. Thus, path grouping and assignment achieves drive serialization. Assignment and path grouping are accomplished by a host through a set of special channel commands defined for the purpose. MVS and some other host operating systems follow this drive serialization convention.

In a tape drive emulation system, the data output by the host is not actually written to a tape drive and data input by the host is not actually read from a tape drive. In one type of TDE system the data is stored on staging disks.

Data Serialization

The basic unit of data processed by channel commands is a "block." Prior to storage, blocks are usually compressed and "packetized," with each packet including compressed data, a header, and a trailer. As is well-known, the header and trailer include control information, information about the data block, and error checking information.

In a TDE system several packets may be in processing at a given time. Thus, a reliable system for maintaining the sequential ordering inherent in tape-formatted data must be developed for a TDE system.

SUMMARY OF THE INVENTION

According to one aspect of the invention, serialization of packets stored in an extent buffer is assured by associating block ID numbers with blocks received from a host. The order of the block ID numbers is the same as the order in which the blocks are received.

According to another aspect of the invention, a locking system allows only one channel interface at a time to access ownership fields in data structures. These ownership fields are used as a MUTEX to prevent other channel interfaces from obtaining a block ID number from the data structure or incrementing a block ID number until the owning channel interface completes executing its command.

According to another aspect of the invention, the block ID number of the data to be processed next is maintained in a status field of a control data structure. Channel interfaces transfer a block when the block ID of the block to be transferred is equal to the block ID number indicated by the status field.

According to another aspect of the invention, data synchronization can be executed when the block ID which could be assigned to a next block coming from the host is equal to the block ID stored in said status field.

Other features and advantages of the invention will be apparent in view of the following detailed description and appended drawing.

DESCRIPTION OF THE PREFERRED EMBODIMENT

Figure 1:
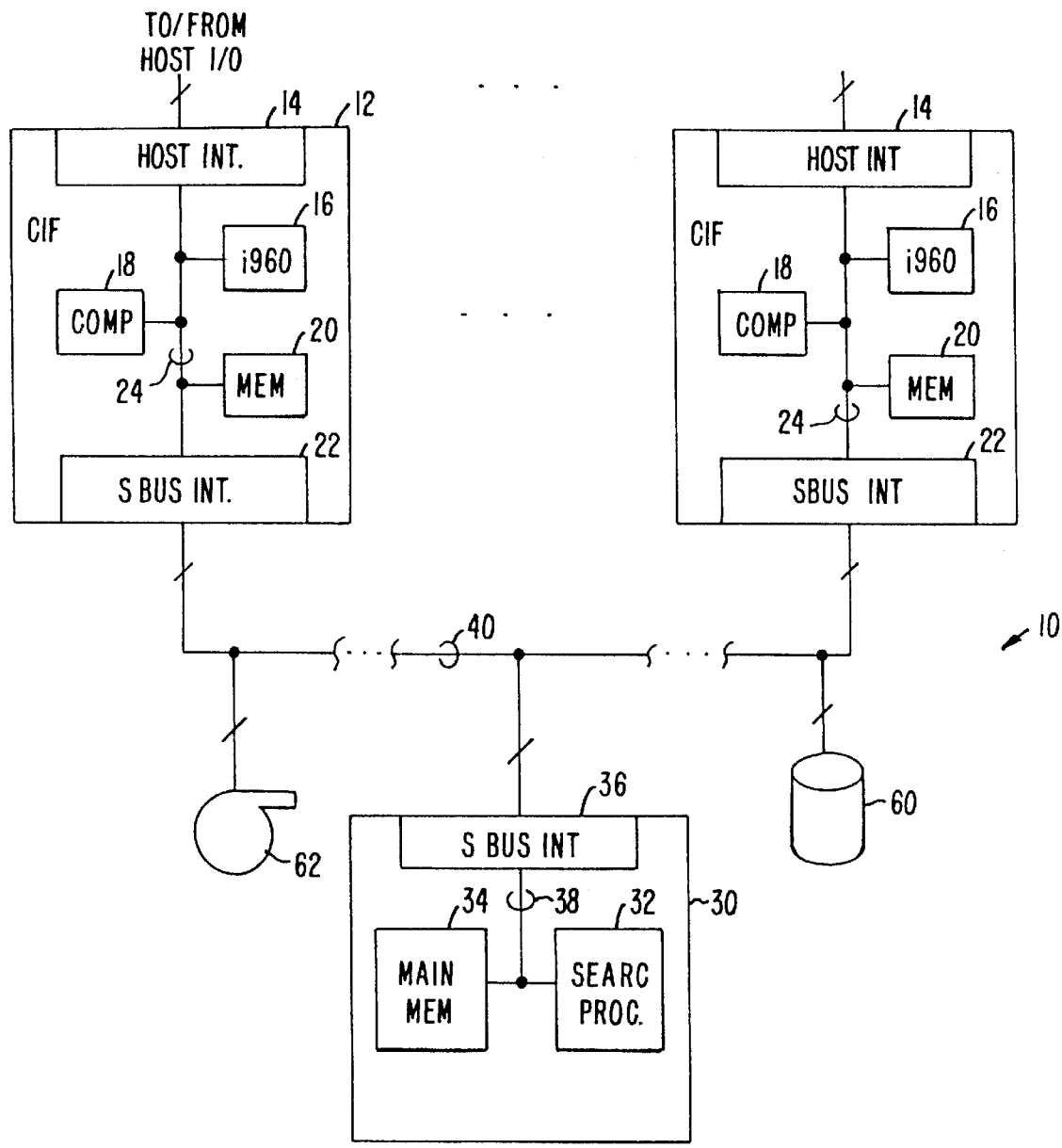
FIG. 1 is a block diagram of a preferred embodiment of the invention.

A preferred embodiment will now be described with reference to the figures, where like or similar elements are designated with the same reference numerals throughout the several views. FIG. 1 is a high level block diagram of a part of a tape drive emulation system 10 utilizing an embodiment of the present invention.

A plurality of channel interfaces (CIFs) 12 are coupled to host I/O channels (not shown) to transfer data between the host and the TDE system 10.

Each CIF 12 includes a host interface 14, an embedded controller 16, a data formatter 18 for performing data compression and other functions, a buffer memory 20, an SBUS interface 22, and an internal bus 24. In the preferred embodiment the embedded processor 16 is a model i960 manufactured by Intel Corporation.

A main controller 30 includes a main processor 32, main memory 34, an SBUS interface 36, and an internal bus 38. In the preferred embodiment, main processor 32 is a SPARC computer manufactured by Sun Microsystems Incorporated. The CIFs 12 and main controller 30 are coupled by a system bus 40.

The tape drive emulation (TDE) system 10 stores host data on "virtual tape drives." In one preferred embodiment the data is actually stored on staging disks 60. Because TDE system 10 must interact with the host as if the data were actually stored on tape drives, a data structure called a virtual tape drive (VTD) is maintained in main memory 34 for each virtual tape drive. The VTD contains all information about the state of the associated virtual tape drive. Various fields in the VTD will be described in detail below.

Control tables used by TDE system 10 to store the current state of path grouping and assignment are kept in shared portions of (SPARC) main memory 34. Any embedded (i960) processor 16 which receives a command from a channel addressing a virtual tape drive consults the shared tables to confirm that the path involved is authorized for execution of the command, before proceeding with execution. Any i960 may also alter the tables, on command from an attached host, if the alteration is allowed by the path control convention.

Because i960's 16 share the path tables, both for reference and update, and because all their table uses need tables in a consistent state, a reliable system of "control-data serialization" must be used.

The CIFs 12 are implemented on dual SBus base boards (DSBs) in a preferred embodiment. A feature of the DSB hardware answers this need for control-data serialization. A set of request/grant lines form a LOCK bus 50 in the backplane, linking circuits on all DSB's, and functioning as a mutex on all SPARC memory shared by the i960s. The facility grants "control" exclusively to one i960 at a time. An i960 can only read or change those items in shared (SPARC) memory needing protection if it has and maintains control of this hardware LOCK. Consistency of the shared items is thus assured.

The path control tables governing drive serialization are always protected by the LOCK. An "ownership" field in the VTD (meaning here the shared-memory structure of control data items characterizing the state of a virtual tape drive) is also only tested or changed under protection of the LOCK.

Data Serialization

Figure 2:
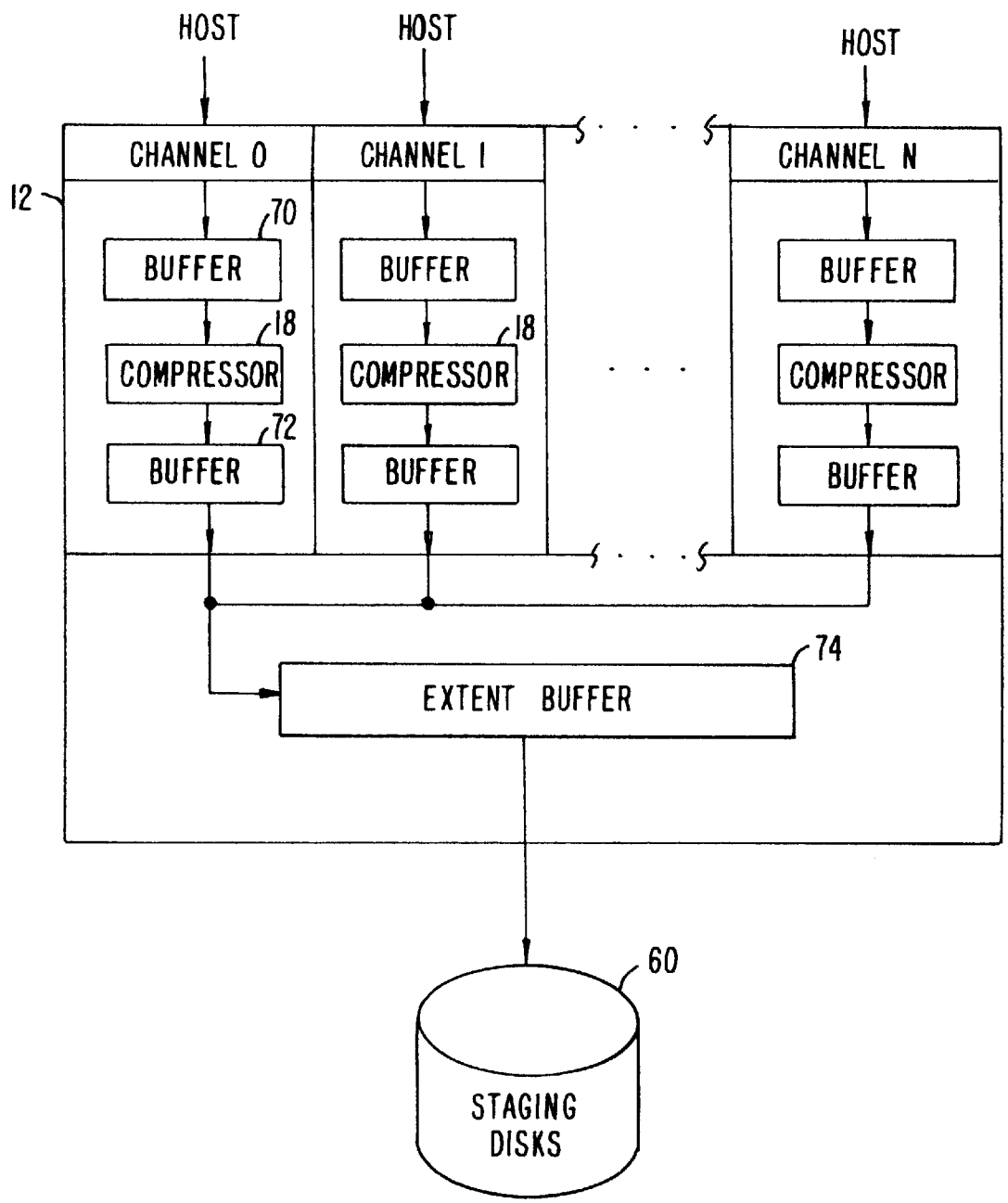
FIG. 2 is a schematic diagram depicting the data paths of the system depicted in FIG. 1.

The data paths of the embodiment depicted in FIG. 1 are shown in FIG. 2. In the preferred embodiment, data is stored on staging disks 60. The staging disk space is treated as collections, called regions, of fixed-size space units called extents.

Figure 3:
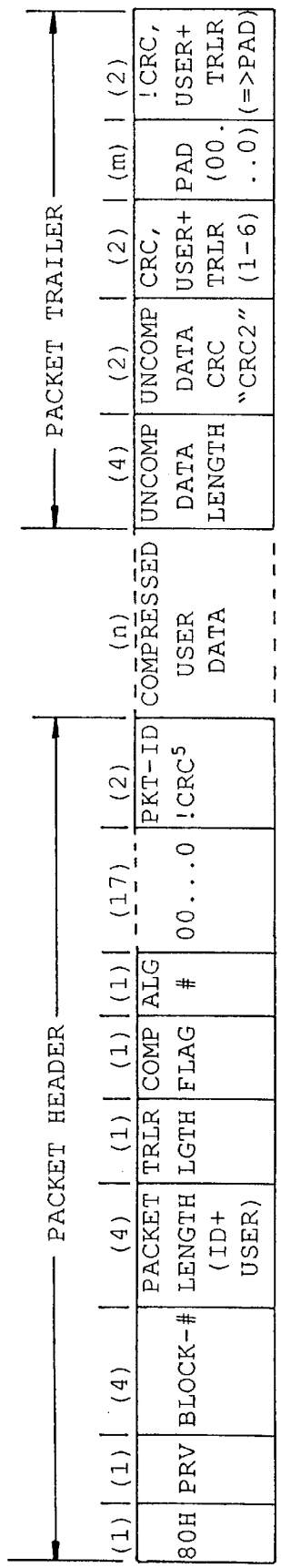
FIG. 3 is a schematic diagram of an ANSI X3.224-1994 packet.

Referring to FIG. 2, packets are formed in the CIFs and stored in extent buffer 74. In a preferred embodiment, the packets are packetized based on the model of data packets of the 3480/IDRC or 3490 (see ANSI X3.224-1994, X3.225-1994). The packet format is depicted in FIG. 3.

The CIF buffers 70 and 72 are regions of the channel interface memory 20. The extent buffer is a region of main memory 34. The size of the extent buffer is the same as the fixed-space unit on the disk to facilitate efficient transfer between the staging disks 60 and extent buffer 74.

In one write mode of operation, entire packets are transferred from the CIFs 12 to the extent buffer 74. When there is not room in the extent buffer for another entire packet the remaining unused part of the extent buffer is packed with ones and then the contents of the buffer are written to a fixed-sized region on the staging disk.

Each packet formed in a CIF 12 is assigned a block ID which is included in the packet. As described below, these block ID's are utilized to assure data serialization.

Three aspects of data serialization are crucial: 1) block ID's must be assigned to data blocks in the sequence of their arrival from a host, 2) the blocks must be delivered to a reading (or spacing) host in block ID order, and 3) packets (containing the numbered data blocks) and virtual tape marks must be loaded into extent buffers in the shared memory according to block ID order.

Figure 4:
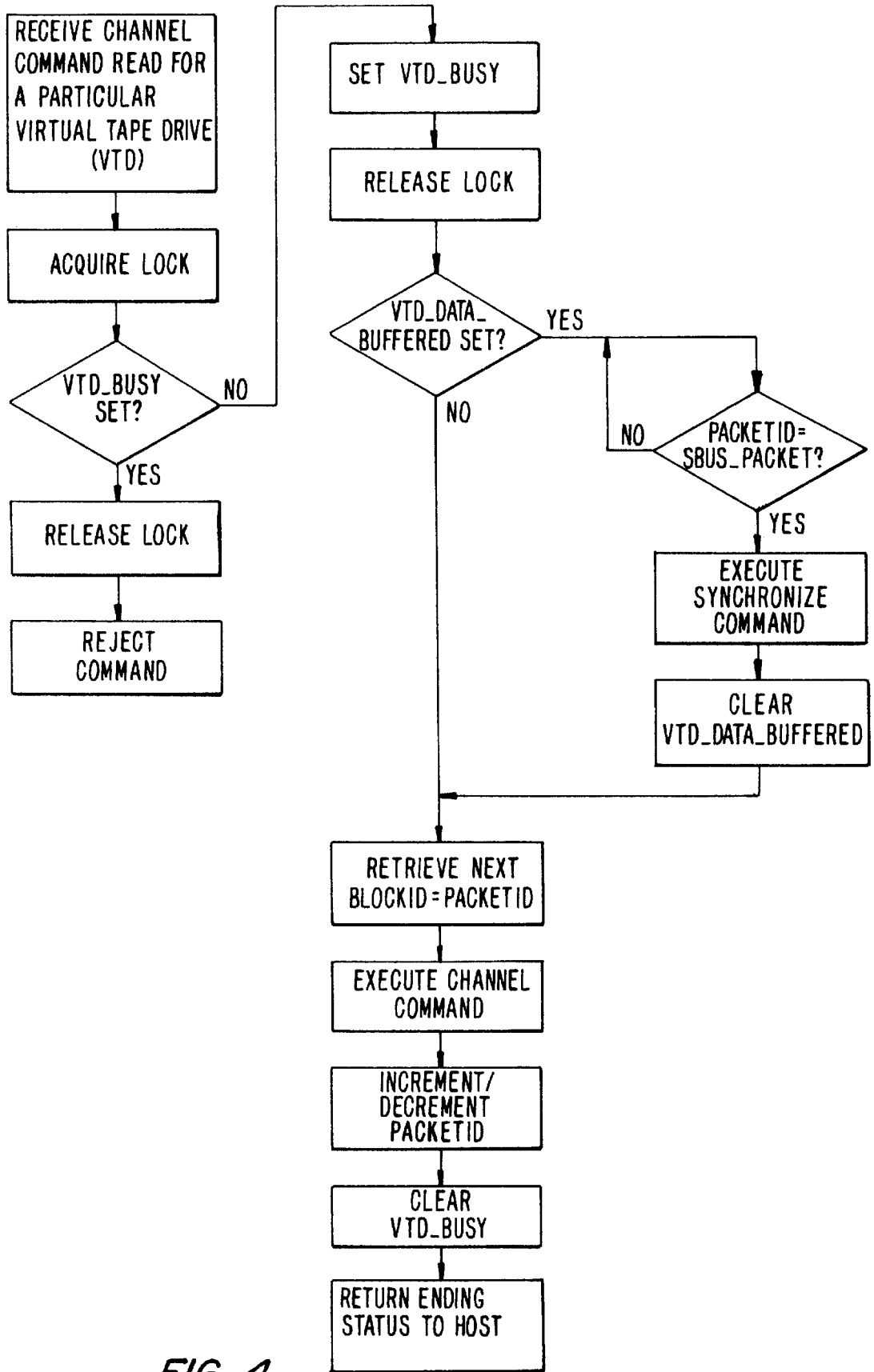
FIG. 4 is a flow chart depicting the steps performed to order block reads.

The ordering of block reads will now be described with reference to the flow chart of FIG. 4.

Each i960 CIF processor 16 executes an instance of a program called TDE-embedded.

When a READ channel command reaches an i960 from a host, that is, reaches an instance of TDE-embedded which is called thisTDE, thisTDE secures the LOCK before beginning execution of the command. The LOCK is secured by asserting a request on the REQ line of the LOCK bus 50 to acquire the LOCK. If the BUSY line is not asserted, then thisTDE acquires the LOCK and has access to ownership fields of the VTD data structure associated with the virtual drive designated by the received command. Possession of the LOCK continues until thisTDE removes the request from the REQ line.

The VTD data structure includes various status elements used to form a mutual exclusion lock (MUTEX) for the VTD. After securing the LOCK, thisTDE queries a status element called VTD_BUSY in the VTD status attribute. VTD_BUSY serves as a mutex for control of a VTD. If VTD_BUSY is set, thisTDE releases the lock and rejects the channel command.

If VTD_BUSY is not set, thisTDE sets VTD_BUSY and thereby secures the VTD against execution of any command by any other i960. Now "owning" the VTD, thisTDE releases the LOCK.

With exclusive control of the VTD now assured, thisTDE finds the proper next block ID in a field of the VTD called packetID, retrieves the block ID, and assigns it to any data block or tape mark incoming from the channel.

Next, a VTD_Data_Buffered status field is checked. If it is not set the steps described immediately below are performed. The steps performed if it is set will be described in connection with executing a SYNCHRONIZE command.

thisTDE executes the READ command, holding the VTD in the VTD_BUSY state all the while.

When all data for the command has moved between the host and the i960 local buffer and ending status has been prepared but not delivered, thisTDE increments or decrements the packetID in the VTD (or not, in some cases of command execution error) in preparation for subsequent commands. thisTDE then releases the VTD by clearing VTD_BUSY from status. LOCK protection is not needed during this release step. Finally, thisTDE returns ending status to the host.

Figure 5:
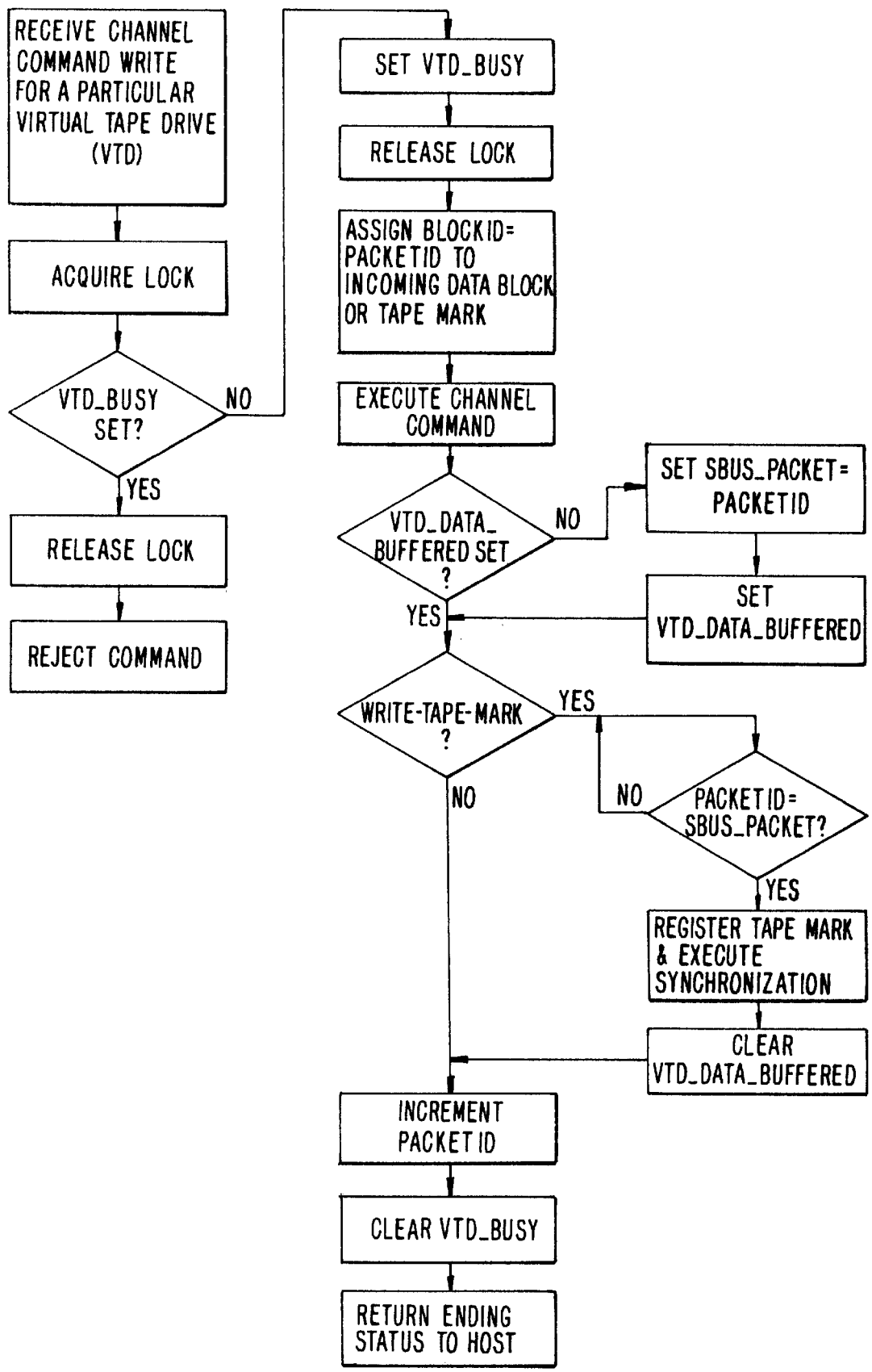
FIG. 5 is a flow chart depicting steps performed to assign block IDs for a write command.

The steps for assignment of block IDs are depicted in FIG. 5. The first several steps are identical to the READ command. After the LOCK is released a packetID is assigned the BlockID.

A field of the VTD called sbusPacket contains the block ID which should appear in the next packet to be loaded into an extent buffer.

The value of the block ID in sbusPacket is initialized under protection of the LOCK by whichever i960 (thisTDE) executes the first of any sequence of writes. thisTDE identifies such a first write by testing a status element called VTD_DATA_BUFFERED. The appearance of VTD_DATA_BUFFERED being set in status means that there is unsynchronized data, either in extent buffers or in i960 local buffers. Thus, if VTD_DATA_BUFFERED is set, the received command is not the first of a sequence of writes. Thus, the block ID in sbusPacket has already been initialized, and some sequence of writes has already begun.

If VTD_DATA_BUFFERED is not set, then thisTDE initializes the block ID in sbusPacket and sets the VTD_DATA_BUFFERED status element.

Once VTD_Data_Buffered is set, the WRITE command is tested to determine whether it is a Write-Tape-Mark command. If it is not, then the steps described immediately below are performed. The steps performed if it is will be described in connection with executing a SYNCHRONIZE command.

When all data for the command has moved between the host and the i960 local buffer and ending status has been prepared but not delivered, thisTDE increments or decrements the packetID in the VTD (or not, in some cases of command execution error) in preparation for subsequent commands. thisTDE then releases the VTD by clearing VTD_BUSY from status. LOCK protection is not needed during this release step. Finally, thisTDE returns ending status to the host.

Figure 6:
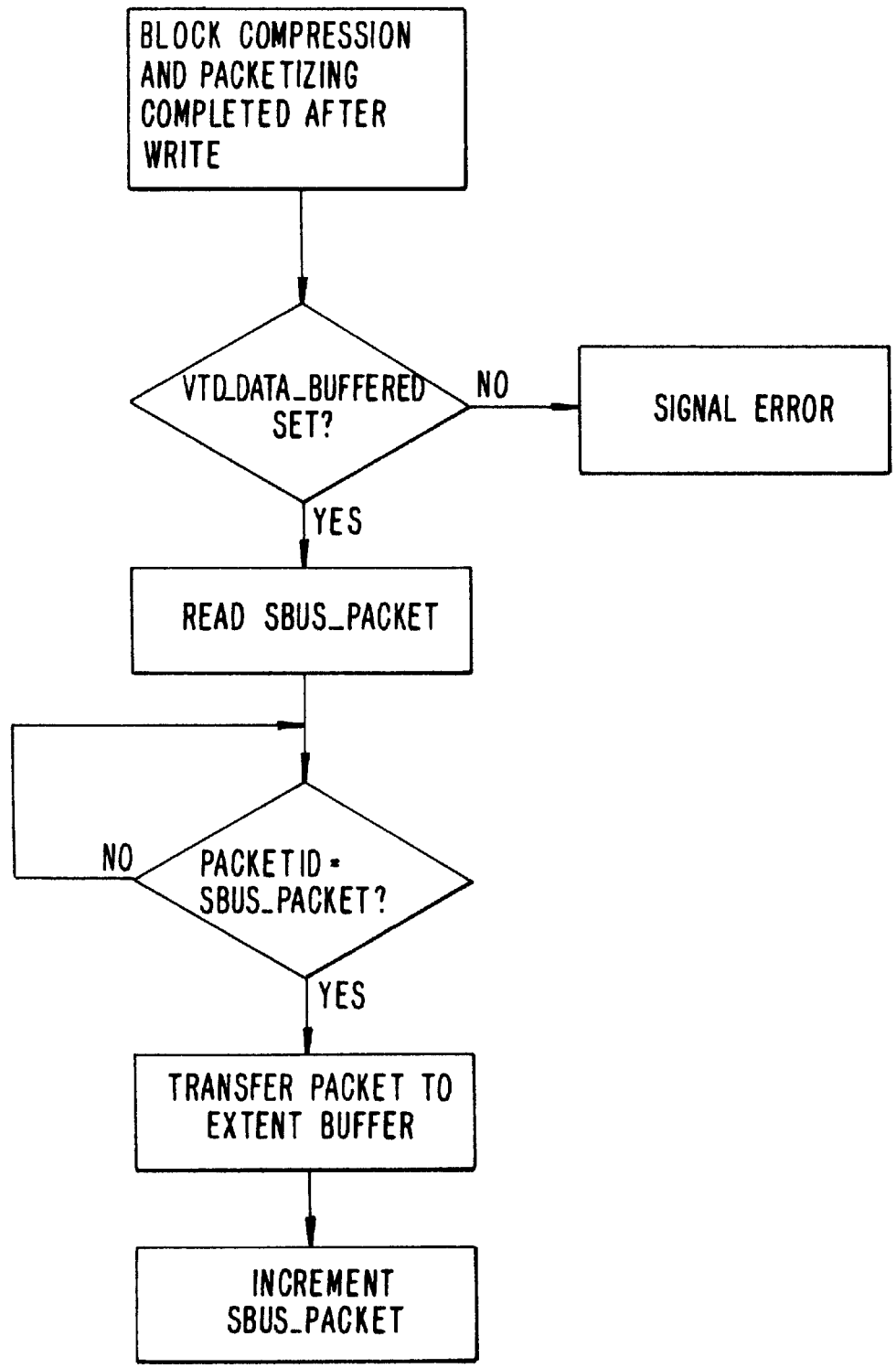
FIG. 6 is a flow chart depicting steps performed to order packets in extent buffers.

The ordering of packets in extent buffers will now be described with reference to FIG. 6. When thisTDE holds a packet in its local buffer with a block ID matching the block ID in sbuspacket, it is assured that no other i960 will load a packet into an extent buffer because a packet can be written to the extent buffer only if its block ID value matches the value of the block ID in sbuspacket. Therefore, the match of packet id's constitutes a mutex or lock on the extent buffers and on all VTD control variables relating to extent buffer management. The TDE instance which, in beginning a new series of writes, initializes the block ID in sbusPacket to match the block ID of the block it is about to receive from a host, thereby locks the extent buffer until its packet reaches the shared memory.

When thisTDE completes transfer of a packet into an extent buffer (shared memory), it adjusts a pointer indicating where in the extent buffer the next block should be stored and increments the block ID in sbusPacket, thereby relinquishing its implied lock on the extent buffer and related resources. No LOCK protection is needed for this release.

As is known in the art, data is synchronized when all host data output to a data storage unit is securely stored on non-volatile media. In the context of the system depicted in FIGS. 1 and 2, a data synchronization command causes all data stored in CIF buffers 70 and 72 and extent buffers 74 be written to the staging disks 60.

Figure 7:
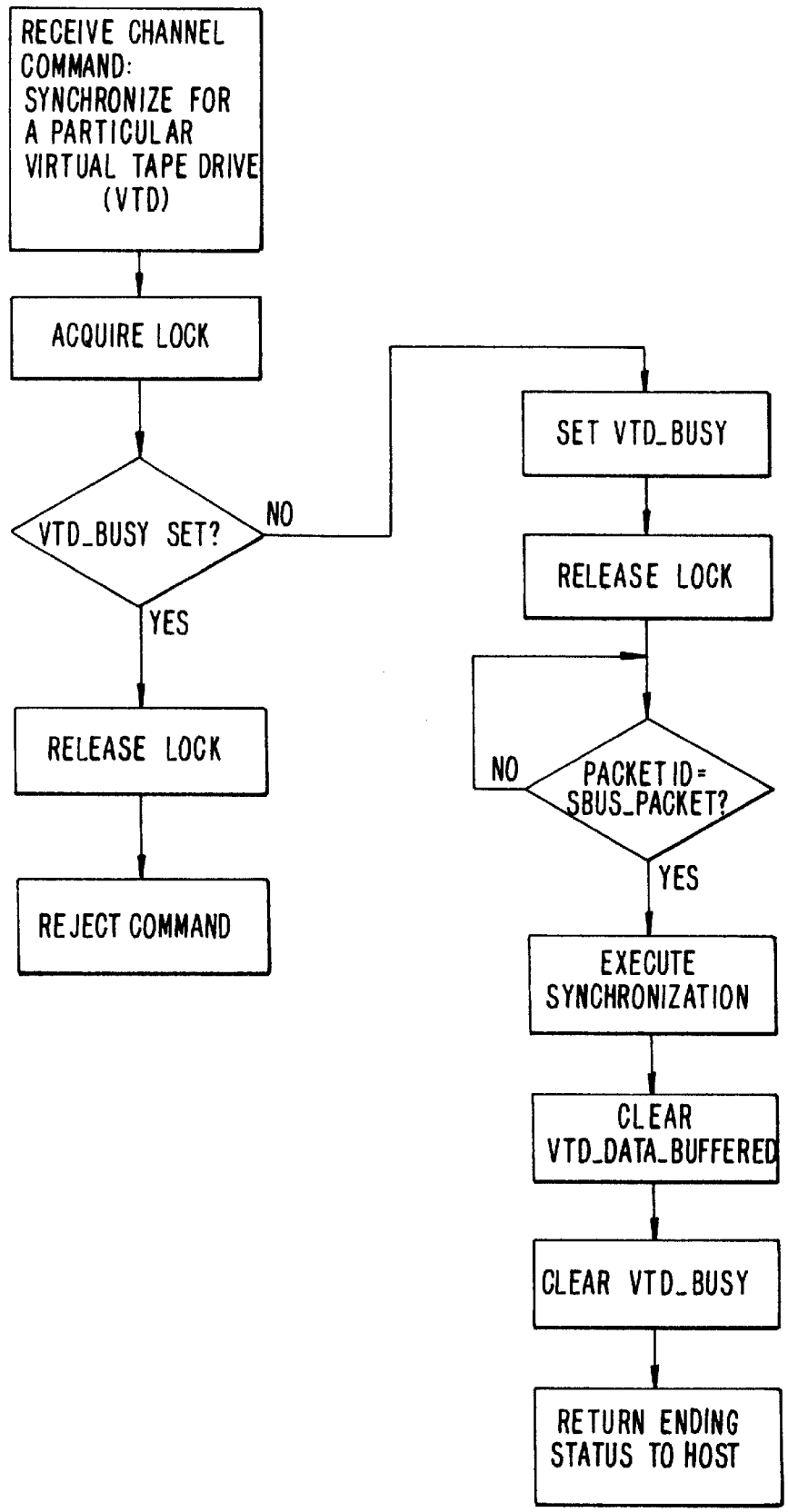
FIG. 7 is a flow chart depicting the steps performed to execute a synchronize command.

The execution of a SYNCHRONIZE command will now be described with reference to the flow chart of FIG. 7. When a command is received that provokes synchronization (write tape mark, BSB, Synchronize, etc.), the i960 executing the command waits until the block ID in sbusPacket and packetID are the same, indicating reliably that no data remains in an i960 local buffer since the next packet to be stored is also the next one to be sent by a host.

Referring back to FIG. 4, PacketID=Sbus_Packet (i.e., the value of the Packet ID to be assigned to any block newly arriving from the host when the synchronize command arises equals the value of the packet ID sbuspacket) may occur for a back-space operation. In this case, a synchronize command is executed. In FIG. 5, PacketID=Sbus_Packet may occur for a write-tape-mark command, in which case a synchronize command is executed.

Referring back to FIG. 7, generally, for a synchronize command, data is synchronized when PacketID=Sbus_Packet. The essence of synchronization is that all unwritten but buffered data must be written to non-volatile media and records identifying storage locations and other status altered by newly added data must be made non-volatile.

Thus, the problem of serialization of data loading into extent buffers is solved by the serialization of block ID assignments, which in turn has the LOCK as its primary underpinning.

The invention has now been described with reference to the preferred embodiments. Alternatives and substitutions will now be apparent to persons of skill in the art. Accordingly, it is not intended to limit the invention, except as provided by the appended claims.

What is claimed is:

1. A method of serializing received packets of data accompanying commands from a data source, the method performed by a data processing system including a plurality of channel interfaces, each channel interface including a buffer and interface controller, with the data processing system further including a main packet data buffer, control data structures in a main memory, and a main processor, with the channel interfaces and main processor coupled by a locking system including request and grant signals, said method comprising the steps of:

receiving a command at a first channel interface;

utilizing said locking system to secure a lock by said first channel interface to prevent other channel interfaces from accessing ownership fields in said control data structures;

querying a _BUSY status element in a control data structure;

if said _BUSY status element is set:
releasing the lock; and
rejecting the command received at said first channel interface;

if said _BUSY status element is not set:
setting the _BUSY status element;
releasing the lock to allow other channel interfaces to access other control data fields;
accessing a PacketID field in the control data structure to obtain a packet ID number;
assigning the packet ID number to an incoming packet associated with the command received;

executing the command received while holding the \_BUSY status element set and storing a packet associated with the command in the buffer of said first channel interface;

subsequent to executing the command, incrementing the packetID in the PacketID field of the control data structure and clearing the \_BUSY status element; and returning ending status to the data source.

2. The method of claim 1 further comprising the steps of:

subsequent to executing the command, if said command is a write command:

querying a \_DATA\_BUFFERED status element in said control data structure to determine whether the write command received is the first of any sequence of writes;

if said \_DATA\_BUFFERED status element is not set, initializing the packet ID in a busPacket field of said data structure to equal a packet ID number assigned to the packet stored in the buffer of the first channel interface and setting the \_DATA\_BUFFERED status element;

if said \_DATA\_BUFFERED status element is set:

writing the packet stored in the buffer of the first channel interface to the main packet buffer when the packet ID number assigned to the packet has a same value as the packet ID in the busPacket field; and incrementing the value of the packet ID in the bus-Packet field.

3. A method of serializing received packets of data accompanying commands from a data source, with the packets included among those to be written to a particular virtual tape volume, the method performed by a data processing system including a plurality of channel interfaces, each channel interface including a buffer and interface controller, said system further including a main packet data buffer, control data structures stored in a main memory, and a main processor, and said control data structures each having a busPacket status element having a packet ID value, said method comprising the steps of:

setting the packet ID value of said buspacket status element equal to a packet ID value of a packet associated with a first write command in a sequence of write commands for writing packets, with the packets associated with said series of write commands having sequential packetID values;

for each write command in the sequence, transferring a packet from a channel interface buffer to the main packet buffer when the packet ID of the packet to be transferred is equal to the packet ID value of the busPacket status element;

for each write command in the sequence, incrementing the value of said packet ID value in the busPacket status element subsequent to transferring the packet to the main packet buffer;

for a synchronize command, executing said synchronize command to transfer packets from the main packet buffer to non-volatile storage when the packetID value at the time the synchronize command arrives is equal to the packet ID value of said buspacket status element to assure that all packets held in the channel interface buffers are stored in said main packet buffer prior to synchronization.

* * * * *